(12) United States Patent (10) Patent No.: US 9,189,197 B1
Lagassey (45) Date of Patent: Nov. 17, 2015

(54) MULTIPLE SHELL MULTI FACETED GRAPHICAL USER INTERFACE

(71) Applicant: Great Northern Research, LLC, Vero Beach, FL (US)

(72) Inventor: Paul J. Lagassey, Vero Beach, FL (US)

(73) Assignee: Great Northern Research, LLC, Vero Beach, FL (US)

( * ) Notice: Subject to any disclaimer, the term of this patent is extended or adjusted under 35 U.S.C. 154(b) by 188 days.

(21) Appl. No.: 13/900,480

(22) Filed: May 22, 2013

Related U.S. Application Data

(63) Continuation of application No. 12/241,035, filed on Sep. 30, 2008, now Pat. No. 8,595,642.

(60) Provisional application No. 60/983,125, filed on Oct. 26, 2007.

(51) Int. Cl.
*G06F 3/16* (2006.01)
*G06T 3/40* (2006.01)
*G06F 17/30* (2006.01)
*G06F 9/44* (2006.01)

(52) U.S. Cl.
CPC .............. *G06F 3/167* (2013.01); *G06F 9/4443* (2013.01); *G06F 2203/04802* (2013.01)

(58) Field of Classification Search
CPC ................ G06F 3/0481; G06F 9/4443; G06F 2203/04802
See application file for complete search history.

(56) References Cited

U.S. PATENT DOCUMENTS

| | | | | |
|---|---|---|---|---|
| 4,712,191 A | * | 12/1987 | Penna ........................... | 715/853 |
| 5,303,388 A | * | 4/1994 | Kreitman et al. ............. | 715/836 |
| 5,632,002 A | * | 5/1997 | Hashimoto et al. ........... | 704/231 |
| 5,678,015 A | * | 10/1997 | Goh .............................. | 715/782 |
| 5,903,870 A | * | 5/1999 | Kaufman ....................... | 704/275 |
| 6,021,403 A | * | 2/2000 | Horvitz et al. .................. | 706/45 |
| 6,061,064 A | * | 5/2000 | Reichlen ....................... | 345/418 |
| 2003/0020671 A1 | * | 1/2003 | Santoro et al. ................. | 345/1.3 |
| 2003/0179240 A1 | * | 9/2003 | Gest .............................. | 345/779 |
| 2006/0080617 A1 | * | 4/2006 | Anderson et al. ............. | 715/779 |
| 2006/0136221 A1 | * | 6/2006 | James et al. ................... | 704/275 |
| 2006/0161863 A1 | * | 7/2006 | Gallo ............................ | 715/810 |

OTHER PUBLICATIONS

Crowley et al., MMConf: An infrastructure for building shared multimedia applications, 1990, Proceedings of the.*

* cited by examiner

*Primary Examiner* — Jordany Nunez
(74) *Attorney, Agent, or Firm* — Steven M. Hoffberg, Esq.; Ostrolenk Faber LLP

(57) ABSTRACT

A multi faceted graphic user interface with multiple shells or layers may be provided for interaction with a user to speech enable interaction with applications and processes that do not necessarily have native support for speech input. The shells may be components of an operating system or of a parent application which supports such shells. Each shell has multiple facets for displaying applications and processes, and typically speech and other input is directed the application or process in the facet which has focus within the active shell. These multiple shells lend themselves to grouping of input or grouping of related applications and processes. For example, input from a speech recognizer, a mouse and a keyboard may each be directed at different shells; or a user may group related windows within various shells, such that all documents are displayed in one shell and all windows of an instant messaging application are displayed in another, thereby enabling better organization of work and work flow.

20 Claims, 3 Drawing Sheets

MULTIPLE SHELL MULTI FACETED GRAPHICAL USER INTERFACE

TABLE OF CONTENTS

1 Background of the invention
  1.1 Field of the Invention
  1.2 Discussion of Prior Art
2 Objects and Summary of the Invention
  2.1 Objects
  2.2 Summary of the Invention
3 Definitions
  3.1 Grammar
  3.2 Command
  3.3 Valid Command
  3.4 Parameter(s)
  3.5 The Command Types
  3.5.1 Command Activation Statement (CAS)
  3.5.2 System Commands
  3.5.3 Application Commands
  3.5.4 Current Command Application (CCA) Commands
  3.5.5 Dictation Commands
  3.6 Commands Dictionary (CD)
  3.7 Registered Applications (RAP)
  3.8 Active Applications
  3.9 SPOCUS
  3.10 Current Command (CC)
  3.11 Current Command Application (CCA)
  3.12 System State
  3.13 Current Command Status
  3.13.1 Unknown
  3.13.2 Incomplete
  3.13.3 System Valid
  3.13.4 Application Valid
  3.13.5 Processed
  3.13.6 Processed Error
  3.13.7 Aborted
  3.13.8 CCA
  3.13.9 CAS
  3.14 System Mode
  3.15 The Input Stream
  3.16 The Data Construct
  3.17 Parsing
4 System Modes
  4.1 Command Mode
  4.2 Wait Mode
  4.3 Content Loop (Mode)
5 Commands Dictionary Overview
  5.1 Command Dictionary
  5.2 Structure
  5.3 Grammar
  5.4 Command
  5.5 Mode
  5.6 Application and points in which the command is relevant
  5.7 Parameters required for completing the command
  5.8 Impact on System Mode:
  5.9 A reference to another command or commands
6 Function of the Speech Enabled System
  6.1 Command Modes and the Command Activation Statement
  6.2 Active VS Visible Applications
  6.3 The Current Command
  6.4 Complex Commands
  6.4.1 Example: "Make an appointment"
  6.5 Processing Commands
  6.5.1 Acquiring User Input
  6.5.2 Parsing
  6.5.3 Validating the command
  6.5.4 Processing (validating) an incomplete command
  6.5.5 Routing the Current Command
  6.5.6 Processing the Current Command
  6.5.7 Managing Commands that Fail at the Application Level
  6.5.8 Granting SPOCUS to the CCA
  6.5.9 The System Mode and Focus or SPOCUS after Processing a Command
  6.5.10 Clearing the Data Construct
  6.5.11 Saving and Restoring the System State
  6.5.12 Resolving Commands Ambiguity
  6.5.13 Resolving Command Ambiguity vs. Resolving Command Completeness
  6.5.14 Processing an Input Stream that Contains Multiple Commands
  6.6 The Content Loop
  6.6.1 Processing Complex Content
  6.6.2 The Content Loop and the CAS
  6.6.3 Dictation Commands in Content Mode
7 The MFGUI
  7.1 MFGUI Overview
  7.2 MFGUI Facets
8 Brief Description of the Figures
  8.1 Overview of the Figures
9 Description of the Figures
  9.1 Detail Description of the Figures
10 CLOSING

1 BACKGROUND OF THE INVENTION 1.1 Field of the Invention

The present invention relates to systems and methods for controlling computer applications and/or processes using voice input. More precisely, the present invention relates to integrating a plurality of applications and/or processes into a common user interface which is controlled mostly by voice activated commands, which allows hands-free control of each process within a common environment.

1.2 Discussion of Prior Art

Speech input user interfaces are well known. This specification expressly incorporates by reference U.S. Pat. No. 6,606,599 and U.S. Pat. No. 6,208,972, which provide a method for integrating computing processes with an interface controlled by voice actuated grammars.

Typical speech driven software technology has traditionally been useful for little more than a dictation system which types what is spoken on a computer display, and has limited command and control capability. Although many applications have attempted to initiate command sequences, this may involve an extensive training session to teach the computer how to handle specific words. Since those words are not maintained in a context based model that simulates intelligence, it is easy to confuse such speech command systems and cause them to malfunction. In addition, the systems are limited in capability to the few applications that support the speech interface.

It is conventionally known that an application window can spawn another window when the application calls for specific user input. When that happens, we call the first window a "parent window", and the spawned window a "child window". This presents certain problems in that the child window generally overlaps its parent window.

Some child windows have to be satiated or terminated before releasing control (active focus) and returning I/O access back to the main application window. Examples of Child Windows are i) a Document window in an application like Word, ii) another foreground, monopolizing (aka Modal) window like File Open, iii) another foreground, non-monopolizing (aka Non-Modal) window.

Every speech-initiated application maintains its own operating window as a "child window" of the system. The child/parent window scheme does not allow for complex command processing. A complex command may require more than one application to be put to contribution in a specific order based on a single spoken command phrase. For example, the spoken command phrase "add Bob to address book" is a multiple-step/multiple-application command. The appropriate commands required by the prior art are: "open address book", "new entry" and "name Bob". In the prior art, each operation is required to be completed one by one in a sequential order. Although this methodology works to a minimum satisfaction level, it does not use natural language speech. The prior art is typically not capable of performing multiple step operations with a single spoken command phrase. In addition, the prior art does not enable a single spoken phrase to process commands that require the application to perform multiple steps without first training the application on the sequence of steps that the command must invoke (much like programming a macro). For example, the spoken command phrase "Write a letter to Bob" requires multiple applications to be used sequentially, and if those applications are not running, they must be launched in order to execute the command. The prior art would typically have the user say: "open address book", "select Bob", "copy address", "open editor", "new letter" and "paste address"—or would require the user to train the application to perform these steps every time it hears this command. The address book and text editor/word processor are generally different applications. Since these programs require the data to be organized in a specific order, the voice commands must be performed in a specific order to achieve the desired result. The prior art is not capable of performing operations across multiple applications entirely on its own with a single spoken command phrase.

In each Windowed Operating System it is common for each executing application window to "pop-up" a new "child window" when a secondary type of interaction is required by the user. When an application is executing a request, focus (an active attention within its window) is granted to it. Windowed operating systems running on personal computers are generally limited to a single active focus to a single window at any given time.

Current computer technology allows application programs to execute their procedures within individual application oriented graphical user interfaces (i.e. "windows"). Each application window program is encapsulated in such a manner that most services available to the user are generally contained within the window. Thus each window is an entity unto itself.

When an application window requires I/O, such as a keyboard input, mouse input or the like, the operating system passes the input data to the application.

Typical computer technologies are not well suited for use with a speech driven interface. The use of parent and child windows creates a multitude of problems since natural language modeling is best suited for complex command processing. Child windows receive active focus as a single window, and because they are sequentially activated by the operating system (single action), and as stated above, prior art speech command applications are not suited for natural language processing of complex commands.

2 OBJECTS AND SUMMARY OF THE INVENTION

2.1 Objects

It is therefore an object of the invention to provide, a system comprising a processor, a memory, a display, a pointing device, wherein an operating system is provided which interacts with a user through a plurality of different graphic user interface shells, each shell having multiple facets for displaying multiple applications and having direct access to hardware resources without requiring handling by another shell and providing coordination of communication between processes displaying within the shell, wherein at least one shell is adapted to permit communication between a process displaying within the at least one shell with a process associated with at least one other shell, and the plurality of shells may be interacted with concurrently by a user.

The at least one shell may be adapted to receive speech input from a user, the at least one shell communicating at least one of commands and data elements to at least one of a plurality of processes associated with the at least one shell. The speech input may be directed to a plurality of applications, at least two of which are associated within different shells. At least one of an application and a process may be displayed in a facet of a shell, which receives a focus based on a user input, and at least a portion of subsequent input from a user may be directed thereto while said application remains with focus.

It is another object to provide a computing system, comprising a processor, random access memory, and nonvolatile storage; an operating system, stored in the non-volatile storage, executing on the processor, and employing the random access memory for operational tasks; and a user interface device, providing at least an input to the operating system; a plurality of software shells for the operating system, each shell communicating with the operating system and supporting execution of applications thereunder, wherein the operating system pipes the input received from the operating system to at least one software shell having a focus; the plurality of software shells being concurrently available to the user and wherein a user action defines the focus.

The operating system may support a plurality of foci, each respective focus representing a different input data type. A plurality of software shells may share a common focus, such that a single user input is concurrently operated upon by a plurality of applications. The operating system may be adapted to receive a user generated input to switch a focus from one software shell to another software shell. At least one application in a facet of said shell may have focus, and the input may be directed thereto. Each shell may have at least two facets, each facet capable of displaying either an application or a process, and wherein a user input grants focus to an application or process displaying within one of said at least two facets.

It is a still further object to provide a human user interface method, comprising: providing a computer operating system supporting a graphic display user interface; and providing a plurality of shells, each respective shell providing an independent interface to the operating system, each shell having a plurality of facets, wherein each respective shell is adapted to support user interaction with a plurality of applications, each facet being associated with an at least one of said applications.

Each respective facet may be adapted to automatically change at least one of a size, a shape and a position in response to a state of other respective facets within the same shell. A number and size of each respective facet may be predetermined. The predetermined number and size of each respective facet may differ between respective ones of the plurality of shells. The plurality of shells may be supplied to the operating system by a separate software construct. The applications which occupy each respective facet may be determined by the user. The applications which occupy each respective facet may be determined by at least one command, or by the operating system. The software construct may determine the applications which occupy each respective facet. At least one of a size, a shape, and a position of a facet may be dynamically varied in dependence on information displayed in the facet.

2.2 Summary of the Invention

The current invention seeks to overcome these limitations by providing a uniform speech aware interface that is optimized for a hands free, speech driven environment and provides the user with a primary interface that minimizes the need for using a keyboard and pointing device. The keyboard and pointing device are not replaced, but rather speech, when available, becomes the primary interface, while giving the user the flexibility to use whatever input means works best at the time. Such a system enhances productivity and is especially useful for contact management, business professionals and anyone looking to eliminate the time consuming procedures of typing, using menus and pushing and shoving windows around a computer display to find the useful data buried therein. In the preferred embodiment of the present invention, by utilizing Speech-To-Text engine, an innovative natural language processor and a unique graphical user interface which can control and contain multiple applications, and display management, the limitations of the prior art are overcome.

According to an aspect of the invention, there is provided for a system and method for controlling a plurality of applications by speech initiated commands spoken by a user, each command having at least one phoneme, the steps comprising: receiving an initial command from a process in response to the user initiating an utterance, the process including a speech recognition process, such as a speech recognition engine or speech-to-text engine (the STT), setting a command mode of operation when the initial command from the step of receiving is determined to be a command activation statement (CAS), cycling through a first loop when in the command mode of operation, under control of the first loop: receiving an input stream, storing the input stream in a data location, searching the data location for a valid command, the step of searching includes comparing each the input stream to commands or derived representations thereof stored in the Commands Dictionary (CD) to determine if the input stream contains a valid command, reporting an error condition when the step of searching does not find a valid command, processing the valid command when the step of searching finds the valid command, the valid command statement corresponding to at least one of the plurality of processes and applications, and optionally dependent on the command, setting the mode of operation to a wait mode of operation when the step of processing the valid command is completed. When the step of searching finds a command statement that is not valid because information needed to process the command is missing, the reporting of an error condition can be one that prompts the user to input the missing information, and cycling through another loop. In this case, the process can be repeated successively until the user builds a valid command or the command input is terminated by the user or the system.

It is noted that the Command Dictionary may be embodied in a data matrix or network, and therefore need not be a simple table entry or human-readable or human comprehendible format. The Command Dictionary may also be associated with disambiguation logic in the case where a plurality of available commands has conditions or states simultaneously satisfied by a prior input.

According to another aspect of the invention, there is a method for controlling a graphical user interface display area for a plurality of applications by speech, and displaying said plurality of applications in a single display window that is composed of multiple facets. Multiple applications are displayed at one time, and applications (and their child windows, if any and if permitted by the application) move in and out of the display area, as they are needed. The size, shape and location of facets can be fixed, or the facets can adjust in size, reshaping themselves, or morphing, to accommodate the number of applications that need to be displayed. From a visual standpoint in a non-Windowed, character-based operating system, the MFGUI occupies the whole display area. That makes the MFGUI the main user interface on the computer system, also fitting the widely accepted definition of a "shell".

The System functions as an interface enabling humans to exercise command and control over computer software applications and to input information into multiple software applications by speech, and in the preferred embodiment provides for a multi-faceted graphical user interface to display multiple applications in a single viewing area instead of being limited to multiple separate and overlapping windows as in the prior art.

Briefly stated, a preferred embodiment of the present invention has two main aspects that provide methods for a human centered user interface utilizing speech to input data and control multiple applications, and a multi-faceted graphical user interface for displaying multiple applications (and their child windows, if any and if permitted by the application) within multiple facets of one main window. While the present invention can be used for command and control and input to applications within the standard parent-child windows used in current computing systems, the preferred embodiment uses both aspects to implement a speech enabled environment to control and display multiple applications in a single window with multiple facets. The preferred embodiment also uses a context based parser such as a natural language model (NLM) to parse speech initiated commands and data, to route those voice initiated inputs to the required applications, and when applicable to determine if speech input is actual commands or input of data. In summary, parsing is the action of identifying the respective roles of uttered words. In the examples below, the roles that would be determined by parsing sentences appear in parenthesis. For example, a typical command could contain i) an optional statement to get the computer's attention, ii) a Command iii) Parameters (more information the command may need).

Example 1

"Computer, turn on (Command) the front lights (Parameter)."

Example 2

"Email (Command) Peter (Parameter—implied recipient) about his car (Parameter—"about" implied subject)

The System functions by parsing the output to a series of speech initiated commands received by a speech recognition process, such as a speech recognition engine or speech to text engine ("STT"), a series of command sequences are identified and tasks are executed by the System. The speech initiated commands can be composed of any type of phoneme (the smallest unit of speech that distinguishes one sound from another), word or phrase in any language supported by said speech recognition process. In the preferred embodiment, speech is used as an input means together with input received from other devices including a series of keyboard inputs or pointing device movements and clicks. Accordingly, although speech is the preferred means of input to the System, all available means of input are available and can be used to initiate the command sequence. In a preferred embodiment of the invention, hands free spoken commands control the execution of tasks by one or more software applications, facilitate managing multiple tasks simultaneously and allows speech control of all applications known to the System. In the ideal embodiment of the System, the System can be controlled entirely by speech, however, it should be noted that in some instances, it is simply more practical and efficient for the user to integrate the use of speech together with the keyboard and pointing device.

The present invention also provides advances for general graphic user interfaces, separate from speech enabled input. For example, the multifaceted graphic user interface may have independent utility.

3 DEFINITIONS

3.1 Grammar

"Grammars" are used by the speech recognition process to generate human readable and/or binary representations of allowable speech input corresponding to, and associating, actions and commands, the representations being used to functionally process the speech input, and to provide a framework for interpreting the commands. The grammars can be held within a command dictionary, discussed below, or dynamically generated by algorithm or other means.

3.2 Command

A "command" is defined as an instruction that can be acted upon, and may include parameters or associated data.

A command may be structured as a grammar and/or unstructured natural language input. A command may have an enabled or disabled state that may be acted upon based on external conditions.

An example of a command might be "Turn Lights On". An example of content might be text that we are dictating into a document in a word processing application, and in the context of that dictation, the spoken words "Mary asked John to turn the lights on" would be considered content.

3.3 Valid Command

A "valid command" is one that is both known and complete. The command matches an entry in the CD (is known to the system) and all the parameters needed to process the command are present (the command is complete).

3.4 Parameter(s)

A "Parameter" is additional information that is needed to process a command. For example, the command "open" needs something to open. Command parameter attributes are contained in the CD for each command.

3.5 The Command Types

In the preferred embodiment, the system has "command activation statement(s)" (CAS) "system commands," "application commands," "current command application commands" and "dictation commands," each of which is defined below.

3.5.1 Command Activation Statement (CAS)

A CAS is defined as a unique word/phrase/keystroke or the like which alerts the System that a user is planning to issue a command, and can be used to put the system in command mode. For example, the word "computer" can be used as a CAS.

3.5.2 System Commands

In the preferred embodiment, system commands (like the command to launch an application) must be preceded by a CAS. These commands are executed by the System. An example could be "Open Calendar."

3.5.3 Application Commands

An application Command can only be processed by an Application (like the command to dial a number in a phone dialer application) and is only valid within the application for which it is intended, as defined in the CD. Note that an application command like "print" for example, may be valid in many applications, however, each application has defined in the CD which application commands are valid for that application, so a command like "print" will be executed within the CCA unless it is specified as a system command to print something in another application. An exit command may be either a system command (to exit the system) or an application command (to exit the application)

3.5.4 Current Command Application (CCA) Commands

These are application commands for the CCA within content loop. Typically, a CAS is not required before a CCA command when the corresponding application is in Content Loop.

3.5.5 Dictation Commands

A dictation command (DC) is one that does not affect the function of, or control the application it is going into, but rather modifies the data. Typically, dictation commands are managed by the speech recognition engine, however, if desired these commands may be handled by other elements of the system. For example, the system may be able to receive a subset of commands that do not control the system or an application, but generate characters to be input into an application, such as a word processing program. Dictation commands are typically used with the system when an application has SPOCUS and is in a content loop. An example of a DC is the "new paragraph" command in a word processing application that is not data, but modifies the data, in this case text. In this example, the dictation command "new paragraph," results in two characters representing carriage returns being placed in the input stream that is being passed to the CCA as input (instead of the words "new paragraph").

3.6 Commands Dictionary (CD)

The "Commands Dictionary" ("CD") is a persistent data structure or set of data structures that maintains commands and if applicable all the information related to the commands.

3.7 Registered Applications (RAP)

A registered application (RAP) is an application in which the functional elements of each command associated with the RAP have been described to the System in the CD. After an application is registered in the system, the application is "known" to the System.

3.8 Active Applications

An "active application" is a Software Application that has been started by the system and is running. The System can send data to and get data from an Active Application. It is important to note that an application does not need to be visible or have focus in order to be active, and that once the System starts an application, even though it may not have focus or may not be visible, it remains active until the system or the user closes it.

3.9 SPOCUS

"Speech Operational Control User Service" (SPOCUS) is an active attention that is granted by the System to an application, which results in directing a speech input stream to that Application.

3.10 Current Command (CC)

The "Current Command" (CC) is defined as the command that the system is currently processing.

3.11 Current Command Application (CCA)

The "Current Command Application" (CCA) is defined as the application that is processing the current command, or part thereof. For example, some commands require the system to activate and give focus to an application that will receive input of data from the user, such as a word processing application that will receive dictation, and that application then has SPOCUS. Note that it may be possible for one application to execute a command without having SPOCUS, and while another application has SPOCUS. For example, issuing a command to turn on the lights while in a word processing application would process the command without needing to grant that application SPOCUS. Furthermore, if multiple applications share identical commands, when such a command is issued, it is executed in the CCA.

3.12 System State

The System State is where the system may be at any given moment, and for example, may consist of the Input Stream, the Data Construct, what application is the CCA, whether is has a facet and its position, the System Mode (content loop or not), a reference to the previous System State (thereby allowing a "stack" or stack type behavior) and any other contextual information.

The System State can be saved at any given point before the system switches states, enabling the system to suspend applications and processes and return to them later in the same state as they were before they were suspended.

3.13 Current Command Status

This is defined as the status of the Current Command (CC). When the system receives input from the user, it processes that input to search for a Command, which could include a CAS, and the Current Command Status depends on the result achieved when the System processes this input.

In the preferred embodiment, the Current Command Status may be set to "unknown," "incomplete," "system valid," "application valid," "processed," "processed error," or "aborted," "CAS" or "CCA Valid." The CC Status may also contain information on the reason for that Command Status, thereby enabling the system to prompt the user for input, guide the user in the command input process, and/or advise the user of the reason for the command status. The following is a brief description of the Current Command Status settings used in the preferred embodiment, although other's may be used in alternate embodiments, depending on the system design:

3.13.1 Unknown

When a command is not found in the input stream, the CC Status is set to "Unknown." If desired, the user can be informed that no command was found in the input stream, and the system can return to Wait Mode.

3.13.2 Incomplete

When a command associated with a known command has been found, but the command has incorrect or missing parameters as indicated in the CD, the CC Status is set to "Incomplete" and the user can be informed of and prompted to input the correct or missing parameters.

3.13.3 System Valid

When a valid Command is a System Command, the CC Status is set to "System Valid" and the command is processed by the system. The CC Status of "System Valid" is used only after a command is determined to be valid (known and complete), and prior to processing the command. After the command is processed, its status will be changed to "processed" or "processed error" depending on the outcome.

3.13.4 Application Valid

When a valid Command is an Application Command, the CC Status is set to "Application Valid" and the command is processed in the associated application. The CC Status of "Application Valid" is used only after a command is determined to be valid (known and complete), and prior to processing the command. After the command is processed, its status will be changed to "processed" or "processed error" depending on the outcome.

3.13.5 Processed

When a valid command has been processed with no error, the CC Status is set to "Processed," and the success information may be communicated to the user.

3.13.6 Processed Error

When a valid command has been processed and failed or returned an error condition, the CC Status is set to "Processed Error," and the reason for the Processed Error may be communicated to the user.

3.13.7 Aborted

A command input can be aborted by the user or by the system. When that happens, the CC status is set to "Aborted."

A user may abort a command input from a command validation loop with an abort command. The system may abort a command input for reasons including, but not limited to, a predetermined time-out for processing a command having passed, or cycling through a command loop a predetermined number of times without successfully completing a valid command.

3.13.8 CCA

When a CCA command is found while the system is in content loop, its command status is set to "CCA" to indicate that the command should be processed in the CCA.

3.13.9 CAS

The system is always in command mode after a CAS. In the preferred embodiment, when a CAS is used to abort a command input or to leave a content loop for the input of a new system or application command, the command status is set to "CAS" so that the system will be left in command mode when it returns to wait for the next command.

3.14 System Mode

The System Mode can be defined as "the type of data that the System expects at this point". In the preferred embodiment, the possible values for the System Mode are "Wait Mode", "Command Mode", or "Content loop," however alternate embodiments could have more, less or different types of modes.

3.15 The Input Stream

The Input Stream is defined as raw data that the system receives from a speech engine, keyboard, pointing device or other input means. Typically the input stream is stored in a memory location until it is parsed into the Data Construct, as defined below.

3.16 The Data Construct

The Data Construct is defined as the location where the analyzed data from the input stream is kept. Typically it is the result of Parsing the Input Stream. In the Data Construct, Commands and raw text may be identified as such, along with whether they have been processed or not.

3.17 Parsing

"Parsing" is defined as the action of identifying the respective roles of uttered words consists of checking the context of the adjacent words (and gaps) to the possible command.

4 SYSTEM MODES

The System mode is a state that determines how input is processed. In the preferred embodiment, the system has three modes of operation: command mode, content loop, and wait mode.

4.1 Command Mode

Command mode is activated whenever the system detects a CAS. When the System enters command mode, it is ready to accept a command. In command mode, the system will only process commands.

4.2 Wait Mode

When the system is in wait mode, it is idle and waiting for a CAS. In wait mode, anything other than a CAS is ignored.

4.3 Content Loop (Mode)

"Content Loop" is a mode in which the System has granted focus to an application (the CCA) and the System is continually sending the incoming input stream to the application, while testing the incoming input stream for commands that match a CAS or an application command, or data such as text going to a word processing application, or data that belongs in a field of the CCA such as a date in a contact management application.

5 COMMANDS DICTIONARY OVERVIEW

5.1 Command Dictionary

In a typical implementation, the commands dictionary is not a human readable, acoustically accessible or otherwise directly comprehensible distinct set of possible commands, but rather comprises a set of information which define a correspondence between an input and an intended command, and information for resolving ambiguity between the possible available commands. As used herein, it is understood that a "Command Dictionary" (CD) is this representation, and that the phrases "Command Dictionary" or "representation of the Command Dictionary" are used interchangeably.

The speech recognition process may operate using a plurality of command dictionaries, each from a different source, but preferably the available command dictionaries at any time are processed to provide a single optimized decision space. However, the command is preferably provided in a form which facilitates this process as the context changes.

According to one example, a user seeks to make an appointment in a calendar program, which must be identified by the date and time, duration, location, participants (optional), confirmation details (optional), topic (optional), and followup (optional). The user begins by identifying the task, such as "make an appointment" or "new appointment" or "meeting" or other possible inputs. These may all represented in the commands dictionary. The user then (in no particular required order) inputs the other details. For example, the time, date and duration inputs may form part of a first command dictionary, the participants a second, the topic a third, confirmation (and contact details) a fourth, and follow-up a fifth, each with a possible different source of information. Since these details may be entered in any order, or even in mixed order, they are concurrently available; likewise, when entering a participant, an address book application or process may initiate, and may temporarily provide additional commands available, such as "add new entry to address book". On the other hand, once a user starts entering time details, the other commands dictionaries may become inactive based on the determined context of input.

Indeed, the commands "meeting" and "appointment" may have different meanings in varying contexts, and thus the commands dictionary for each respective command may differ, even if the end result could be the same. The make an appointment example—interacts with high level and based on the input and analysis of the input builds the grammar/representation for the next step in the loop.

A "command" can be processed by a command processor, and any input that is not a command or portion thereof, or a command parameter, may be deemed to be "content", and is passed to an application. As discussed above, in some embodiments, a command dictionary may also be employed at a higher level in processing data which may be represented as text and/or parametric information. Thus, at the speech recognizer level, a speech input may be treated as "content" to be passed to a higher level application, but at the application level, this may nevertheless be treated as a command, portion thereof, or command parameter.

An example of a command might be "Turn Lights On". This input could be processed at the speech recognition engine level, to determine if the input represents a command, and to pass that command for processing. This input could alternately be processed at the application level, wherein a speech recognition process passes the literal string "TURN LIGHTS ON", or any other meta-data corresponding and handled at the application level, to a command parser, which employs data of the CD to determine if all necessary parameters needed for unambiguously processing the command are available. An example of content might be text that we are dictating into a word processing document.

Some commands are only valid while in Command mode, others while in content mode, others in all modes. In some embodiments, the speech commands are dynamically available. At some times, it may be desirable to limit the domain of available speech commands dynamically based on commands available to the system at that time.

Higher level attributes for commands are maintained in the Command Dictionary (CD), and the data stored in the CD may include (but is not limited to) what information is needed to act upon a command, how the command is processed, and its impact on the system. By representing the impact or result of a processed command, the system state post command processing may be compared with the represented impact, and thus a failsafe mechanism provided. In some cases, for example, if the processed command state does not correspond to the represented impact, the system state may be reverted. Likewise, the post-command processing impact may be used to adapt the command processing for subsequent inputs.

In the preferred embodiment, commands associated with applications are registered with the system. In the preferred embodiment, an application is registered with the system by adding each functional aspect of the application to the Commands Dictionary, and when so registered it is referred to as a registered application (RAP). Thus, in the preferred embodiment a dictionary (the CD) corresponding to all the commands required for all "known" system commands and application commands is constructed, and that CD allows the System to identify the commands with the corresponding applications, commands, messages, events and methods, and use them in processing speech input from the user. While it is desirable to persistently maintain this information in the CD, some of this information about commands may be generated dynamically as needed.

The process of registering applications consists of updating the CD by adding the necessary entries required for an application and its functional aspects with the System. This can be done by any means that will enter the necessary data for the application in the CD, including but not limited to registering an applications commands in the CD at the time the application is installed, exercising various user interface elements to expose the command and control structures, manually inputting data into the CD, hard-coding it into the System program, or enabling the System to dynamically update the CD at the time of initialization, as needed, or as requested by the user. The process of registering application data and commands in the CD can also utilize a combination of methods, for example, the System can be made aware of an application by an entry in the CD that enables the System to import and append data from that application into the CD at the time of initialization or when data is updated. This is particularly useful with applications such as contact lists, where the application's data changes from time-to-time. Alternatively, a software application can guide the user by helping him or her entering the information into the System.

For Example, one application which lends itself to voice commands is a telephone dialer program. During registration of the telephone dialer application, a series of command structures are registered with the System which correspond to commands and parameters used by the telephone dialer and, and the CD is updated to contain the information from which the commands or their representations are constructed, and from which the speech recognition process builds its dictionary of command representations, relevant to the telephone dialer application. Examples of the required commands could be keywords and phrases or grammars such as: "dial", "call", "connect", "hang-up", "disconnect", "hold", "transfer", "forward", "redial" and the like. Once the application is registered, the System knows about the commands and parameters associated with the telephone dialer program and its functional features. Further, in the case of the telephone dialer, the contact data may be updated dynamically.

The CD is preferably stored in a persistent manner, meaning that the CD survives the System being shut down and restarted. It can be stored in any format typically used to store data that can be read by the system and applications, including but not limited to a file in its own format, a database file, table, or process registration database.

5.2 Structure

The CD is a collection of instances of a data structure, and can be in the form of a database, vocabulary table, process registration database, other database, XML file or any other data structure. Each entry in the CD pertains to a specific command and its attributes. These attributes may vary depending on the command, and may include but are not limited to the following:

1—Grammar
2—Command
3—Command Mode (optional)
4—Context the command is relevant in.
5—Parameters required for completing the command.
6—Impact on System Mode.
7—A reference to another entry for cases where multiple commands must be executed sequentially for a given spoken command.

Depending on the needs of the system, alternate embodiments could utilize other parameters not discussed here.

5.3 Grammar

This entry contains information defining the grammar of the command.

In order to enhance the natural language processing capabilities of the system, the CD can hold multiple entries or series of entries for the same command, effectively having the side effect of maintaining "synonyms" for commands. For example, the user could say "Turn on the living room light", or "Living room light on", or "light up living room". The CD has entries for "turn on", "on", and "light up," and all these commands are equivalent and give the same result.

5.4 Command

When the System finds an entry in the CD that corresponds to a representation of the associated grammar or matching conditions with the recognized text in the incoming input stream related to the System or the relevant application, the value of this field identifies the target of the operation (command) that must be processed. In other words, a Command is the instruction a user wants the computer to process when the user inputs a command.

5.5 Mode

This indicates the System state in which the system searches audio input to determine whether it contains a command. For example, a system command may be valid only while the system is in Command Mode (or it may be valid in all modes), whereas an application command may be valid only while its associated application has focus. Typically, the System considers only the command types that are identified as valid for the current System state. For example, in one embodiment, while in a Content Loop, the system will only consider and process application commands related to the CCA until a CAS places the system in command mode or a command to exit the CCA is received and processed. In certain other embodiments, no such limitation is applicable.

5.6 Application and Points in which the Command is Relevant

Because the same speech input may correspond to different commands in different applications, or represent a command which is available in a plurality of applications, this field identifies the application(s) to which this command applies.

For example, consider two commands with the grammar "open". One is registered as a Home Control command to open the blinds, the other is registered by a word processing application to open a file. When the system knows the mode it is in and which application is the CCA, it can select which command to execute from the CD. In addition, there may be points in the system, such as where the user is prompted and has only a few choices (such as a prompt to confirm or cancel a command), in which only a few commands are applicable. In such cases, the test for a known and valid command can be limited to the applicable commands only, and a CAS need not precede such commands. Likewise, the command to open a file or perform an action may imply a default application needs to be started if it is not already running. In many instances, a CAS is not necessary, and the mode may be inferred from the context, such as a hiatus of speech input prior to and subsequent to an utterance, or based on a semantic analysis of the input.

This field also specifies whether the Application must be visible, and if it must be given SPOCUS and enter a content loop.

5.7 Parameters Required for Completing the Command

Some commands require more information about what they should be acting on, and some commands may need to call other commands. This entry enables the system to process complex commands with multiple parts. It enables the system to test if a command is valid and complete, and react accordingly.

For example, the "Turn On" command by itself is not sufficient. Therefore its entry in the CD needs to specify a parameter that meets the criteria of something that can be turned on or off. A dialog mode may therefore provide a prompt to seek resolution of ambiguity or to complete entry of required parameters. Another more complete example is described in Example: "Make an appointment" in Section 6.4.1.

The CD may also specify that parameters must meet certain conditions, for example that the starting time of an appointment time must be some time in the future.

5.8 Impact on System Mode

Some commands have the capability of changing the System mode or switching focus to another application after they are completed. Often, when an application is done processing a command, it is desirable to return focus to the application that previously had focus. In a preferred embodiment, when it is necessary to return to the previous system state after processing a command, information about the system or application state may be saved prior to processing a command in another application. The information in the CD on the impact that a command has on the System state can also be used to determine whether or not the System state must be restored to the original state after processing the command, however, in some variations, the system may be designed to return to the last application that had focus when another application is closed or removed from focus.

5.9 A Reference to Another Command or Commands

This information is for cases where one command requires that multiple commands be processed. A parameter that enables the System to call another command or series of commands, or to link commands together enables the System to manage long, varying or complex spoken command statements. An example of a complex command is "Go to bed", which may turn off the lights and the TV, turn down the heat, and set the alarm.

6 FUNCTION OF THE SPEECH ENABLED SYSTEM

6.1 Command Modes and the Command Activation Statement

Once the System is initialized, the System enters a wait mode, waiting for user input. In a preferred embodiment, whenever the System is in wait mode, a CAS needs to precede a command in order to put the system in command mode. Typically, the system returns to wait mode after processing a command, however, in alternate embodiments the system can simply be left in command mode to wait for the next command. Once the CAS is uttered and detected by the System, the System goes into command mode. Once the system goes into Command Mode, it remains there until some condition is met which returns the system to wait mode. This may be a time-out, command to return to wait mode, or the completion of another event, such as the processing of a command. In other embodiments, the CAS may not be required.

As defined previously, a CAS is a unique word/phrase/keystroke or the like which alerts the System that a user is planning to issue a command. For example, a CAS could be a word phrase, such as "computer" or "microphone on", or the computer could simply be placed in command mode by turning on the microphone. A command to return to wait mode could be "microphone off" or a command which puts the computer into another state, such as a mode in which the microphone is used for purposes other than processing commands or entering data. Each CAS is defined in the CD, but in alternate embodiments can also be defined in a separate CAS dictionary.

In an alternate embodiment, the System defaults to command mode until a specific command (like "Dictation") sets it into a content loop or a command (like "standby") sets it to wait mode. In alternate embodiments, the system is in command mode at all times so that input given in the correct context (for example, a pause, followed by a command, followed by another pause) is searched for a matching command. In such alternate embodiments, the behavior of command statements take on the characteristics of a CAS, and if desired the use of a CAS preceding a command is not required, or a CAS such as "microphone on" is used to place the system in command mode, and the system remains in command mode processing successive commands without returning to wait mode, until a command such as "microphone off" for example returns the system to wait mode.

In a preferred embodiment, when the system is in content loop, application commands for the CCA do not require a preceding CAS. In alternate embodiments, it may be desirable to have a CAS precede both system and application commands while in a content loop. In such alternate embodiments, when a CAS is detected while in the CCA, the System waits for input then processes the incoming input stream to determine if it contains a CCA or System command, and if so determines its context. If no command is detected in the input following a CAS, the System may: report an error condition and prompt the user, ignore the incoming input stream, or assume the incoming input stream is content and pass it as data to the CCA leaving the System in content loop with SPOCUS on the CCA. Still other alternate embodiments may not require a CAS preceding any command while in content loop, or the system may remain in command mode after processing a command in order to wait for another command.

6.2 Active VS Visible Applications

All applications that are activated (either in the System initialization process, or by command) remain active until closed. Since the System locates the applications for the user, it is not necessary for an application to be visible in order to process a command.

For example, one application can retrieve data from another application without displaying the other application, or a command (for example, "Turn on the kitchen lights") can be processed without displaying the application that controls the lights.

6.3 The Current Command

As discussed above, when the System determines that it has received a command, the information in the CD indicates which application should be called on to process the command, and what parameters, if any, are required for appropriately processing the command. It should be noted that some commands impact only the system, while others require the system to interact with one or more applications.

If a command is intended to be processed by an application, and the appropriate application is not active, the System starts the application, and that application becomes the CCA and may be displayed in the graphic user interface and granted focus if required or appropriate for user interaction with the application. The CD may also indicate if the application is one that accepts input of data, and if so, the system may enter content loop with respect top that application.

In a preferred embodiment, the System does not execute applications itself, but it requests the operating system ("OS") to execute the applications, and for that the OS loads them in memory, and allocates to them some processing time. However, in some embodiments, the System is a speech enabled operating system and performs this function.

6.4 Complex Commands

Some commands require more information about what they should be acting upon. These commands are called "complex" because they require other information in order to be complete, and this other information and its nature are maintained in the CD. A single spoken command may contain multiple components. In the preferred embodiment, the system is able to manage a complex incoming input stream such as this, identify its components and route them accordingly. A data construct derived from the speech input is analyzed to determine a target application for the input, and the required application is started if it is not currently active. For example, a contact management application might be activated by the input "Open the calendar and show me today's appointments."

In response, the system executes a command to "open calendar" to ensure that the calendar application is active, and a command to "show appointments" to trigger an action within the calendar application. "Today" is an input to the application, which indicates to the calendar application which appointments to show.

The next section further illustrates how the system handles a complex command.

6.4.1 Example

"Make an Appointment"

This example illustrates the power of the System's capability to validate complex commands by identifying and prompting for missing parameters. The complex command "make an appointment" that is handled by a "contact management" application has an entry in the CD that also indicates that it requires four parameters (although there could be other parameters) as follows:

The person's name.
The date of the appointment.
The start time of the appointment.
The end time of the appointment.
The user may enter the command as:
User: "Make an appointment with John Smith on Tuesday at 8:00 AM."

However, in this case, the command is a known command (make an appointment) but it is not a valid command because it is missing an end time and is thus not complete. In this example, the system will prompt the user for more information:

System: "Please provide an ending time for your appointment."

If the user responds with a valid ending time (a time that is later than the start time of the appointment) the system will process the command by sending it to the contact management application. If not, the system will continue to prompt the user for a valid ending time until one is provided or the command is aborted.

There may also be other criteria required by that command, for example, the person's name being in the contact list, the date being equal to or later than the current date, the start time being later than the current time, and as discussed above, the end time being later than the start time. The system could also require other parameters or relationships of parameters as well.

Carrying this example further, when the user is prompted to supply an ending time, and responds with "eleven am," this will result in the command statement being validated and processed. But if the user responds with "Wednesday" or "seven am" that input does not meet the test for a valid ending time, and in the preferred embodiment the user would again be prompted to supply a valid ending time for the appointment. Similarly, the system tests other parameters in the same way, for example verifying that the contact's name is an entry in the contact manager, that the date of the appointment is the current date or later, and that if the appointment is on the current date the start time is later than the current time.

In summary, in the command example described above, the system receives the incoming input stream which is analyzed based on the CD to determine which application the stream should be routed to (the contact manager), starting the required application (if it is not currently active), initiating a command which is recognizable by the contact manager (which is now the CCA), and giving the contact manager the parameter (today) that it needs to process the command (to show today's appointments).

Another example of a complex command (in this case, one that is processed exclusively in the CCA in a content loop) is "save and print document" which, results in the current document in the CCA being saved (one CCA command) and printed (another CCA command).

6.5 Processing Commands

6.5.1 Acquiring User Input

In a high level processing schema, a user input may be processed by acquiring the data from an input stream (for example the output of a speech recognition process or speech to text engine or the input from keyboard or mouse click), and the data parsed into a data construct so that the system can act upon that data. The data construct can be kept in a memory queue, a memory address, a register, an operating system pipe, a shared memory area, on a hard disk drive or any other means of passing data from an outside resource into a program. In instances where the system has been integrated together with the input stream processing program (for example, a speech recognition process, the input stream can be passed directly into the System in memory. In any case, the data elements received from the acquired input stream correspond to the data which is being supplied by the primary interface (i.e. in the preferred embodiment, the microphone providing input to the speech recognition process engine which in turn is processed and passed to the System as text or other type of input that is usable by the System).

6.5.2 Parsing

In a preferred embodiment, the Input Stream needs to be processed into data in a form in which that data can be used by the System, and this is done by parsing the input stream into a context-based data construct, and storing it in a memory location.

In this preferred embodiment, a natural linguistic model is used parse the speech input into a context based data construct in order to enable the system to determine if the possible command is within the scope of the adjacent words. The linguistic model is used to tag verbs, nouns, adjectives etc. However, in alternate embodiments, other forms of context-based analysis could be utilized. Parsing is well defined in the art, and need not be discussed in more detail here.

It is also important to note that testing the input for commands, and further testing of commands for context, enables a CAS or command to be spoken in a context unrelated to a CAS or command. By reviewing the locus of words around a possible CAS or command and chronology, the context may be determined and an appropriate action taken. Accordingly, the System will not mistake input that contains a utterances corresponding to a CAS or command, if the utterances are spoken in the context of a sentence. For example, if the CAS is "Hal", the statement "Hal needs lunch" is to be passed on to the CCA as text.

One criterion for identifying a CAS or a command can be the presence of a pause or brief silence of predetermined length before and after speaking the CAS or a command. If no pause or silence is detected, the speech input is assumed to be part of the content. If the speech input is preceded and followed by silence, it is likely to be a CAS or a command. In alternate embodiments certain commands, like dictation commands, will always be executed as commands. Other embodiments, the context is determined by testing elements of the input stream preceding and following the CAS or command to determine if they are within the context of the sentence being spoken, and a CAS or command not in context is processed as a CAS or a command.

6.5.3 Validating the Command

After a command is determined to have been received, it may be one that has a non-trivial CD entry, and requires further validation. To validate a command, the System refers to the CD corresponding to the command matching the one found in the Data Construct. The CD entry for the known command indicates the required parameters, if any, and the data construct is further tested to determine if these parameters are all present and valid indicating a valid (known and complete) command. If it is determined that the user stated a valid command, the command is processed. Otherwise, the system will prompt the user to input the missing information (see below, Section 6.5.4 "Processing (validating) an incomplete command." In other cases, a command may be received which, for example, has a trivial CD entry, and therefore the determined existence of the command itself is sufficient for processing.

In variations of the preferred embodiment, the CD can be organized by command groups, or into different tables or dictionaries with limited command sets. This is useful when the system is working in an application or process with a limited set of commands, or when the system is being used in a task or manner where there is a limited field of possible commands. For example, when the system is in a dialog which displays "Cancel" and "Continue" as the only two options, then there is no need to search representations of all possible commands for a matching command when the user provides input in response to the dialog. It is only necessary to search audio input for the commands that are currently available, in this case "Cancel" and "Continue" which are the only two options available in this dialog which currently has focus (active attention). Likewise, when using a calculator application, only the subset of commands related to the calculator and whichever system commands are then currently available need be considered and other commands, such as the commands used by a home automation application, for example, do not need to be considered while the calculator is the active application. If this method for organizing the CD is employed, then when processing input in these cases, the system searches only the representations of the applicable portions of the CD, (or the applicable CD or table) for a matching command, rather than searching the entire CD.

Another method for achieving this is to create and register a representation of a grammar that has the available commands based on the system state, and to do this each time the system state or user interface changes and/or or is refreshed. In some cases, the visible dialog menus of an application are dynamically organized. For example, Microsoft Office 2003 provides pull-down menus which include most likely or most frequently used options. In theory, by limiting the number of options, presented to the user, the search time to find the desire selection will decrease, while the ability of the user to target a desired selection using the interface is enhanced by the limited number of choices. In like fashion, the speech recognition process(es) may employ a reduced or focused set of available choices, which will likely improve the discrimination between the choices and thus improve accuracy.

Thus, the speech interface may be responsive to changes in the visual user interface, but the visual user interface may be responsive to alterations in the status or context of he speech user interface. The interaction between these may be controlled at various levels, including the process, application, operating system or speech processing components. In the preferred case, the interaction is controlled at the operating system level, using application API features, and thus would be compatible with applications which are both intrinsically speech enabled and those which are not.

6.5.4 Processing (Validating) an Incomplete Command

There are many reasons why a command statement may be incomplete. Most often it is because the user has spoken a command with incomplete or incorrect information (missing, incomplete or incorrect parameters), but it can also be the result of a speech recognition error caused by many possible factors including but not limited to the user not speaking clearly, not speaking into the microphone or background noise. Or maybe the system just didn't correctly recognize all the words spoken by the user.

When the step of searching finds a known command, but which is incomplete, meaning the incoming input stream did not contain all of the required parameters needed for that command, or otherwise not appropriate for processing, there are a number of possible options. These options include but are not limited to: returning to wait mode, reporting an error condition, or as in a preferred embodiment, reporting an error condition and prompting the user to input the missing parameters and cycling through at least one loop to retest the Data Construct for a valid command. This permits the system to process and manage complex commands that contain incomplete or incorrect information, and compensate for errors in speech recognition. The system may also present a confirmation dialog to the user, presenting the command and the available information, along with a prompt for the missing, incorrect, inconsistent or ambiguous information. How this works is best illustrated in the Make an Appointment Example in Section 6.4.1.

This process of prompting can be accomplished by cycling through one or more loops, recursive calls or other algorithms, and can take place at various steps in the system according to the design of the embodiment as will be shown in the discussion of the FIGS. in Section 9.1. As the user supplies additional input, the parsing process refines the data construct by parsing additional input into the data construct then re-testing the data construct for validity. This process continues until a valid command statement is found in the data construct, or the user aborts the command input process, which can be done by issuing an abort command, a command activation statement (CAS), a new command, or by any other manner which may be desirable for aborting a command input such as a time-out, reaching a predetermined number of cycles without finding a valid command, or the occurrence of other predetermined events.

By being able to identify and prompt for missing command parameters, the system guides the user through the input of complex commands, which would otherwise fail, and the system is able to build a valid command. An example is the command statement: "open the garage door and turn on the lights." Depending on entries in the CD, this could result in the garage door being opened and all the lights being turned on, or in the user being prompted for which lights to turn on.

In alternate embodiments, the process of prompting the user for additional information can be done in various ways and at various places throughout the process, the object being to enable the system to help the user to complete the input of a command statement that can be validated and processed by the System, or return the user to a point where he or she can restate the command or state a new command.

For example, in alternate embodiments, when a command is recognized, but determined to be incomplete, the system can start over requiring the user to repeat the entire command; it can re-validate only the missing information when the user is prompted and supplies more input (instead of adding new input to the data construct and re-testing the entire data construct); or simply inform the user or return to wait mode without taking any additional action.

In yet other alternate embodiments, recursive functions or recursive functions combined with looping functions can be used to validate known commands that have missing or incorrect or inconsistent parameters. In one such alternate embodiment, the system uses recursive functions that each call for a piece of missing or incorrect command component. For example, this recursive function can operate in the following manner: If there are N missing/invalid parameters, the system launches a recursive function that launches itself again, until N functions have been launched, each such function being designated to prompt for and receive one component of the missing/incorrect parameters. After all the functions have been launched, the last one launched prompts the user for the parameter for which it is responsible, and when that parameter has been received, validated and entered into the data construct (or aborted by the user or a predetermined condition), the function exits, returning to the previous function which does the same thing for its designated missing/incorrect parameter, and this process continues until all the instances of the function have exited, so long as none of them was aborted, and the command is thereby validated (known and complete) and ready to be processed.

In variations of this alternate embodiment, the recursive functions may be required only to prompt for and collect input on missing/invalid parameter, and once all the functions have returned, the user input received from each is parsed into the data construct, and the data construct is again tested for a valid command. If the data construct still has missing or invalid or inconsistent parameters, the system cycles through another loop and this process of launching recursive functions repeats itself. This looping process continues until the command is validated, or is aborted by the user or by the system after meeting a predetermined condition (typically exceeding a predetermined time or number of loops or a time-out condition occurs).

The dialog may also prompt the user to supply all missing, incorrect or inconsistent information in a unitary process, and parse the received result to determine whether the received information satisfies all validity conditions. If not, the user may be prompted again. If the prompts do not yield progress toward resolution of the validation process, the system may then revert to a set of serial prompts seeking single parameter or issue resolution.

6.5.5 Routing the Current Command

In a preferred embodiment, if a command applies only to the system, it will be processed by the system. If not, and if the command applies to the CCA, it will be processed by the CCA. If not, and a command is valid for only one application, the system will send the command to that application. If a command can be processed in more than one application, and none of those applications are the CCA, then the system will prompt the user to select which of the valid applications will receive the command. If an application in which a command must be processed is inactive, the application is launched before processing the command. This sequencing priority enables the system to manage commands that are valid in multiple applications, for example "open" that can open the garage door in one application, and open a file in another application. In alternate embodiments, instead of, or prior to, having the user select which of the candidate applications will process the command, the system searches for an application in which the command is valid. For example, if two applications can process the "Open" command, the command "Open Garage Door" is not be valid in a word processing application, and the system will select the application that can open the garage door. In this alternate embodiment, if the system fails to find an application that can successfully process the command, then the user can be prompted to select the application.

6.5.6 Processing the Current Command

In accordance with one embodiment of the invention, a focus (an active attention) is granted to the current command application (CCA), which is the application that corresponds to the Current Command (CC). In the preferred embodiment, when the System has determined that the current command (CC) is valid (known and complete), the associated entry in the CD indicates whether the CC is a System Command or an Application Command, and if applicable the application that is associated with the CC, in which case the application is referred to as the current command application (CCA).

If the CC is a valid System command, the CC it is processed by the system.

If the CCA is not already active, it is started, and if applicable, the CCA may receive the focus, although some commands can be processed in the background without the need for giving the application focus. Some commands may result in focus being granted to another application, while in other instances a command may be processed while focus remains with or is returned to the previous application after the command is processed.

If the CC requires the CCA to be visible, then the CCA is made visible and in most instances the CCA is granted focus.

If the command calls for granting SPOCUS to the CCA, which may be independently granted from a known graphic user interface or operating system focus, the system grants SPOCUS to the CCA, and speech input is then directed to the CCA. Indeed, separate applications having SPOCUS and focus, respectively, may be concurrently active and receive separate user inputs, without mutual interference. In some cases, the CCA may be adapted to receive speech input as a native data type, or the CCA may directly interact with the speech recognition engine. Therefore, once SPOCUS is granted to the CCA, the system may curtail processing of commands in the speech input, and cease processing speech as data. For example, the system may be reactivated to a normal mode by requiring a specific CAS, and otherwise be idle. For example, this may be useful when it is desired to process sound as other than speech input, or when the application having SPOCUS is capable of processing its own speech input.

Still in other instances, it may be desirable for the system to direct speech input to the application which has focus, and if a command is not found in the input stream, to pass the input stream as text or sound data by default.

If the CC is an Application command, the CD contains the information the System needs to determine which application can process the command. Typically, an application command is executed in the CCA, and if two applications share identical commands, the CCA will have priority. However, some application commands may require the system to switch to another application. In such instances, depending on the nature of the command, the other application may or may not receive the focus, and after processing the command the focus may remain with the new application (in which case it becomes the CCA) or return to the previous CCA.

6.5.7 Managing Commands that Fail at the Application Level

There are instances where a command may be known to the system to belong to an application, and may have the necessary parameters to be a valid command, but where the command may fail at the application level. For example, in an application that turns on the lights, the system may not always know which lights can be turned on by the application. So a command to "turn on the garden lights" may be validated by the system since "turn on" is a known command, the parameter "light" belongs to the application that turns on the lights, and there is an additional parameter naming a light that can be turned on ("garden"). This command is valid at the system level, but if the "garden lights" are not known to that application, then the command will fail at the application level. When this happens, typically the application will generate an error message (although some applications may do nothing). In variations of a preferred embodiment, there are numerous ways the system can deal with this. Some examples include closing the command and prompting the user to issue another command, reporting the error condition (which may be done by either the system or the application) and prompting the user to restate the command, granting SPOCUS to the application or its child window so the user can interact with the application and its prompts, enabling the user to modify and retry the command, or providing the user with the option to process the command in another valid application. In some variations, the system may be designed to accept and process the output from the application thereby enabling management of failed application commands at the system level. These examples are not intended to be all inclusive or limiting, and are intended to demonstrate the flexibility in which the system can be designed to manage commands and applications where, as with a command that fails at the application level, some of the functionality falls outside the scope of the system. When in a content loop associated with an application, a preferred method is for the system to set an error condition, where the processing of the error condition is done within a loop that is handled by the CCA, or in a new stack managed by the System. Since the possible command choices are typically limited to only one or a few commands required by the error condition, when the user responds, the system searches the input only for the applicable commands, and the error condition can be processed without requiring a CAS to precede such commands.

It is possible to have nested (recursive) loops, overlapping loops, and repetitive loops. Further, in a data-driven architecture, the process of waiting for a valid or complete data input may be a different paradigm than a traditional software loop, but it is understood that this accomplishes the same end result and will be encompassed under the term loop as used herein.

6.5.8 Granting SPOCUS to the CCA

Typically, when an application has focus, keyboard, mouse and speech input are directed at that application. When the Current Command (CC) calls for the System to grant SPOCUS (Speech Operational Control User Service, an active attention) to the CCA, and commands and data resulting from speech input are directed at the CCA. Although only one application may have SPOCUS at any given time, one application may have SPOCUS while the other has focus, or the same application may have SPOCUS and focus. Likewise, the application having SPOCUS may be in a content loop, in a preferred embodiment, all active applications and their corresponding facets (if any) remain known to the System as active. The System is able to switch to any one of the active applications or activate other applications if a command so requires, and the System can grant SPOCUS or focus to, and can send and receive data to and from any one of the active applications if it is determined that the incoming input stream should be routed into a particular application. Likewise, the System can retrieve data from any one of the active applications.

Because the speech input from a single user represents a single stream, which may include data intended for the application and commands for that application. If the system were to try to analyze speech input for multiple tasks, inconsistencies and errors are quite likely, and further, this is non-ergonomic, since a normal user will typically address language commands or data to a single task at a time, and then redirect his focus to another or a subsequent data or command task. Therefore, this SPOCUS model of interaction is consistent with user expectations, and will result in lower user errors and system errors. It is understood, however, that granting SPOCUS or focus to a single process or application, and analyzing the speech input in the context of that single application or process, is not a technological limitation of the present invention, and as appropriate, the speech input may be subject to a plurality of simultaneously active analyzers, each with its own properties, and to determine whether they are intended to be invoked.

As discussed above, since all applications are still active, the System can send data to or receive data from any one of the active applications. Thus, the system branches into other applications (which then become the CCA when they have focus) without closing the current CCA), and the System can return to any application in the same state where it was left because the System state was saved before switching out of that application. Typically, the System remains always active and monitors the acquired input stream, so the System can receive a command (preceded by a CAS in a preferred embodiment), which is outside of the CCA, (a system command or an application command from any application known to the System). Upon receiving this command, the system activates another CCA, granting SPOCUS to the new CCA, and executes the other application. When the subsequent application or process is closed or sent into the background, the system may return SPOCUS back to the previous CCA. The system can perform this recursive type of behavior over a plurality of CCA's.

6.5.9 The System Mode and Focus or SPOCUS after Processing a Command

With some commands, it is desirable for the system to return to its previous state after the command is processed. The system mode after processing a command is specified in the CD for each specific system command, although it could be defined elsewhere in alternate embodiments. This can depend on what the system was doing prior to the command statement, and the nature of the command statement itself.

Typically, System commands will either leave focus or SPOCUS to the application that had focus or SPOCUS prior to the command (processing the command in the background), the application associated with the command, or grant focus or SPOCUS to the application while processing the command and return to the previous application. For example, the command statement to launch a second application while focus or SPOCUS on a first application (the CCA) typically leaves the system with focus or SPOCUS on the second application and it becomes the CCA.

Other commands (such as a command to turn on the lights) are processed and the System returns to its previous state (either wait mode or the CCA that had focus or SPOCUS before the command). Sometimes, these commands can be processed in the background, giving the appearance that the CCA before the command was executed never lost focus or SPOCUS. For example, while in a word processing application, the command to "turn on the kitchen lights" may be processed in the background, thereby leaving (or returning) return focus or SPOCUS to the word processing application after processing the command.

Typically, Application commands will leave the system with focus or SPOCUS on the CCA. Exceptions include when is an application command to exit the application (the CCA), or an application command that temporarily switches to another application.

Some commands can operate as both system commands and application commands. For example, the system command to open a file will give focus or SPOCUS to the application designated for that file type and result in the desired file being opened in that application, while the application command to open a file while in its associated CCA, will open the file and leave the focus or SPOCUS on the CCA.

Dictation commands affect only data that is being placed in the CCA, and typically do not affect the system mode. A dictation command results in the dictation command data being generated and placed in the data at the appropriate point where the dictation command is spoken.

In some systems, a cue may be used to determine whether or not the system processes speech input as speech commands or data, or even to which application the speech input is to be directed. For example, a video camera may be provided which is directed at the user, and determines which facet or window the user is looking at or pointing at. Likewise, if the user is looking away from the visual user interface, the processing of speech by the system may be suspended. Other cues which may alter the treatment of speech input may include a room occupancy sensor, telephone ringing or use, keyboard or pointing device input, or environment. For example, in a vehicular speech recognition control system, the context of speech input can be determined based on vehicular data, such as speed, traffic, steering inputs, detection of increased stress in the user's voice, or vetronics system data, and the speech input processed accordingly, for example to present default options which are more probable based on the environment, or to limit options which are unsafe or unwise.

6.5.10 Clearing the Data Construct

Typically, it is desirable for the system to clear the data construct when a CAS is spoken, when a command has been processed successfully, or when a command input is aborted by the user or by the system when a predetermined condition for aborting a command input is met. If the system is designed to process multiple commands per input stream, it may be desirable to clear data associated with each individual command after that command segment is processed or aborted. In alternate embodiments it may be desirable not to clear the data construct, to clear the data construct upon other conditions being met, or to save the data from each command input stream in a separate memory or persistent storage location. If the latter is employed, other conditions may be used to limit the space occupied in memory or persistent storage by the stacks of stored data constructs, for example limiting the size of memory or storage used, and/or limiting the number of stacks to a fixed value.

6.5.11 Saving and Restoring the System State

In a preferred embodiment, if it is necessary to switch focus or SPOCUS from one application to another in order to process a new command then return to that application at a later time, the state of the system with respect to the application which has focus or SPOCUS is saved in a memory location before placing focus or SPOCUS on the succeeding application. When returning to the application that formerly had focus or SPOCUS, this enables the system to restore its complete State back to what it was at before switching focus or SPOCUS to the other application. The result of saving and restoring the system state can be compared to how systems of the prior art switch focus or SPOCUS between application windows, returning to an application in its previous state when an overlapping window is closed or minimized. However, alternate embodiments may employ other means to return to an application in its previous state after processing a command. For example, a new command can leave focus or SPOCUS on its application requiring the user to issue another command to return to the previous application, or the task can be left to the operating system.

6.5.12 Resolving Commands Ambiguity

In some cases, a given speech input may correspond to more than one command in the system. When such ambiguity exists, it may be desirable to prompt the user and let the user choose which application to use, or it may be desirable to let the system decide which application to use by assigning a predetermined order in which applications will have the priority for processing such commands. This is important, because the System will consider the command as successfully processed whenever any application has successfully processed a command. So if a command can be successfully processed in more than one application (or the system and two or more applications), the disambiguation provided by subsequent user input, or the order in which the system seeks to process the command (system, CCA, active application, inactive application) will ultimately determine which application will process the command.

For example, a command may be valid only for the system, for the system and one or more applications, for only one application, or for more than one application. If the command is valid for one or more applications, the application may have focus or SPOCUS, be active and visible, active and not visible, or not active.

When a command is valid for the system and at least one application, or when a command is valid for more than one application, some factors that may be considered in determining the priority for which command processor will process the command will include:

If there is ambiguity, should the user be prompted to provide disambiguation information?
If the command is valid for the System, should the system always have the priority at processing the command?
If an application is the CCA, should it have priority over other applications?
Should a visible active application have priority over a non-visible active application?
Should an active application have priority over an inactive application?
If the command is missing parameters for one of the applications, does the System try the command in the other application instead of trying to complete/correct the command?
When does the system prompt the user to complete/correct the command?
Should the system prompt the user to make a choice when there is more than one possible path for processing a command?

Determining the priority by considering each these questions (and possibly others) enables flexibility in designing how an embodiment of the system will process commands which are valid in multiple instances, and can automate the process to minimize the need for user intervention. In a preferred embodiment the system implements the priority algorithm by answering yes to each of the questions above, and "the last" to the last question, although alternate embodiments could follow looser or stricter rules, or command-dependent rules, depending on the needs that the system is designed to meet.

6.5.13 Resolving Command Ambiguity vs. Resolving Command Completeness

It should be noted that resolving command ambiguity differs from resolving command completeness.

Typically, disambiguation tales place at a lower level and involves a command that can be processed in more than one target, prompting the user to select a target for the command from amoung the possible targets, and processing the command based on the input provided by the user.

Whereas resolving completeness typically takes place at a higher level and involves prompting the user for elements of missing information to build a completeness, and processing the command when the user has supplied all the necessary components of information needed to successfully process the command.

6.5.14 Processing an Input Stream that Contains Multiple Commands

Typically, the system is designed to accept one command per input stream, and multiple commands are input one at a time, however it may be desirable to allow the user to input more than one command per input stream. Note that this differs from a single command with multiple parameters. For example, the command "open document (name) and show me today's appointments," could require both a word processing application and a calendar application. As shown in more detail in the discussion on FIG. 6E, alternate embodiments of the system can be designed to manage multiple commands in a single input stream by identifying the number of known commands in the input stream, and validating/processing each known command parameter individually, or validating all the known command parameters then processing all the valid commands that have been identified.

6.6 The Content Loop

Some commands require the system to activate and give focus or SPOCUS to an application that will receive input of data from the user, for example a word processing application that will receive dictation. When a current command (CC) has activated or given focus or SPOCUS to such an application, it becomes the CCA, and the system may enter a Content Loop with respect to that application. If focus and SPOCUS are granted to different applications or processes, then there are potentially two different CCAs, $CCA_f$ (focus) and $CCA_s$ (SPOCUS). Indeed, this schema may be extended to a larger number, with different applications receiving or processing user input from various sources. Typically, with a single user and a consolidated multimedia user interface, focus and SPOCUS will be granted together, while in a dispersed user interface, or one in which the graphic user interface is not the primary interface, the two may diverge. Focus is at a low level interacting with the speech engine and SPOCUS is at a high level interacting with the system.

The incoming input stream is analyzed to determine which application the stream should be routed to, starting the required application if it is not currently active, and initiating a command which is recognizable by the word processing application which becomes the CCA. For example, a word processing application might be activated by the user uttering the command "Open the presentation text document." This phrase is parsed (divided up into system/application related pieces) as a command to "open the word processing application" which is a System Command that initiates a CCA (the word processing application) and starts a Content Loop (in accordance with the parameters in the CD for the command "open --- text document").

After the system enters a content loop, subsequent input is generally routed to the CCA while continuing to parse and test components of the incoming input stream for commands indicating a CAS, a system command an application command, or a dictation command. Any data that is determined to be content is passed to the CCA to be placed in the required field of the CCA. If a command is found in any segment of the incoming input stream, it is further tested to determine whether it is an actual command, or content that is within the context of the input (data). In a preferred embodiment, this is done using a natural linguistic model to determine if the possible command is within the scope of prior and subsequent words. The linguistic model is used to identify parts of speech, such as verbs, nouns, adjectives etc. and then by checking the context of the adjacent words to the possible command, which may include periods of silence indicating a pause preceding and following a command. Such periods of silence, such as a pause in dictation before and after a command, can be one of the preferred means for determining whether or not a command is within context of dictation or an actual command.

If a command is not within the context of the input, then the system determines if the command is a CAS, an application command, or a dictation command, and the command is processed accordingly.

While in a preferred embodiment, a natural linguistic model is the preferred means used to determine if the possible command is within the scope of the adjacent words, in alternate embodiments, other forms of context-based analysis or linguistics models can be utilized. Other methods include determining if a command is spoken in the course of continuous dictation, for example without a pause before or after the command, which indicates it is intended to be part of dictation.

When in Content Loop, the System continuously processes the incoming speech input in this way until it is instructed to abort or suspend the Content Loop by either an exit CCA command or a CAS that sets command mode, which is usually followed by a new command switches focus to another application. Alternatively, the CCA can be exited with a CAS followed by a System command to close that CCA, however, typically a CAS is used to precede a new command that switches focus or SPOCUS to another application.

6.6.1 Processing Complex Content

When the system is in Content Loop, an incoming input stream can (and with a complex or multiple part commands, usually does) contain more than one command and/or component of data, for example, "save and print document" which will return from the Parse Complex process (S900) as two components that are CCA application commands and will result in the current document being saved (one command) and printed (another command). As another example, the above input stream could have included text to precede the two commands, in which case there would have been three data components, text to be inserted into the CCA and two application commands save and print.

6.6.2 The Content Loop and the CAS

In a preferred embodiment, when the system is in content loop, application commands for the CCA do not require a preceding CAS, however, a CAS must precede a system command or a command intended for an application other than the CCA. In alternate embodiments, it may be desirable to have a CAS precede both system and application commands while in a content loop. In such alternate embodiments, when a CAS is detected while in the CCA, the System waits for input then processes the incoming input stream to determine if it contains a CCA or System command, and if so determines its context. If no command is detected in the input following a CAS, the System may either report an error condition and prompt the user, ignore the incoming input stream, or assume the incoming input stream is content and passes it as data to the CCA leaving the System in content loop with SPOCUS on the CCA. Still other alternate embodiments may not require a CAS preceding any command while in content loop, and all input is tested for both system and application commands.

However, while the System is in a content loop, a CAS does not need to precede an application command statement or DC. In alternate embodiments, a CAS may have to precede application commands or a dictation command (DC).

In alternate embodiments, the content loop can take place as part of the parsing process in command mode, or the system can simply ignore the input if a command is not detected after a CAS, in which case the system can return to wait mode without any further action.

6.6.3 Dictation Commands in Content Mode

On a system that uses a speech to text engine, the speech to text engine may include dictation command capability. However, there may be instances where the speech to text engine or the CCA do not support dictation commands, or where it may be desirable for the system to incorporate this function, and to have the system generate dictation command data (characters) and place those characters in the data to be passed to the CCA. For example, the dictation command "New Paragraph" is not a system command or application command, but rather inserts two line breaks in place of the command words "New Paragraph." The processing of dictation commands is shown in optional steps S914 and S915 in FIG. 9A, which illustrates the enablement of an embodiment of the system which supports dictation commands.

7 THE MFGUI

In addition to being speech enabled, the preferred embodiment combines another aspect of the present invention to manage the display. This is referred to as the Multi Faceted Graphical User Interface ("MFGUI"). As discussed above, the MFGUI seeks to overcome the limitations of current technology that uses individual windows for each application, which inhibits easily viewing more than one application and its contents simultaneously, and can result in a cluttered display when too many windows are open and piled on top of each other. Accordingly, a windowed environment that requires a mouse and keyboard to navigate windows is not best suited for use with speech, and it will become obvious from the following discussion that the MFGUI of the present invention is ideal for a speech enabled environment.

7.1 MFGUI Overview

From a visual standpoint in a Windowed GUI-based operating system the MFGUI appears like a "high-level window". In these Operating Systems a high-level window is defined as one that is not a child of any other window, with the possible exception of the "desktop window", in which case the MFGUI has a privileged status. The desktop window has no parent window and acts as a "shell" by making child windows out of the applications placed within. According to one embodiment of the invention, the MFGUI bypasses the normal application Operating System shell and directly access the graphical capabilities of the hardware, or communicates with the hardware or hardware driver. Therefore, the MFGUI may occupy the entire display, enabling the use of the MFGUI as the main user interface on a computer system, fitting the widely accepted definition of a "shell". But in a Windowed GUI-based operating system, the MFGUI could also serve as one of other high-level windows, living side-by-side or together with other applications on the computer display.

According to the present invention, a user may have a plurality of different privileged user I/O environments available concurrently, each simultaneously active, each presenting different applications, status, and layout. Typically, in this embodiment, the multiple I/O environments each act as a separate shell, accessible simultaneously to a single user, for a single operating system which performs coordination tasks such as file locking, hardware contention, and ultimately, switching between environments as may be necessary. Typically, a graphic user interface has a single focus, and user input is presumed by the system to be directed to that focus, which is, for example, controlled by a single application.

In the case of multiple privileged shell-type environments, a plurality of foci and shared foci may be provided. For example, different types of user input may be presented to different environments; pointing device input may be ported to a first environment, keyboard input to another, and voice input to another. Likewise, the same input may be presented to multiple environments, for example a search string may be submitted to multiple search engines through multiple browsers simultaneously; alternately, a speech input may be processed by a plurality of applications in parallel, wherein typically only a single application will ultimately extract a useful command suitable for execution, while the other applications will abort or fail to find such a command; in a case where multiple applications find executable commands in a speech input, these can each take appropriate action. For example, if a user seeks to "make an appointment", and multiple calendar applications are available, each may accept the appointment command data. Typically, the user is alerted to such duplication, for example visually, and may correct or avoid an error. In a graphic user interface environment, output contention is typically not an issue, since each task can control its own window without ambiguity. However, for other output interface types, such as audio, a focus or foci may also be implemented, with rules to control contention.

A particular advantage of this type of user interface is that it permits a user to have multiple different high level "views" of a single system, each tuned, for example, to a different task or set of I/O capabilities. Typically, the user can switch rapidly and seamlessly between these "views".

In one alternate embodiment, the System is used as a speech enabled operating system, and the MFGUI is the main display, functioning as the desktop. In yet other embodiments, multiple MFGUI windows can co-exist and applications are called into view by calling their respective MFGUI window. This latter embodiment lends itself to grouping applications, and navigating between MFGUI windows to view those applications. For example, a user can organize applications with various MFGUI Windows such that in a word processing application and all of its open documents could reside in one MFGUI window, while the components of a contact management application could reside in another, and the components of an instant messaging application could reside in yet another. When switching between different MFGUI windows or contexts, one application or one component of an application typically maintains focus, and focus can be directed to any one of the facets of an MFGUI window by the user. When a user switches to another MFGUI window, then returns, typically the facet which had focus will retain focus when returning; however, there could be instances where it is desirable for a facet to defer focus to another facet, such as a contacts instant messaging dialog deferring focus to the parent instant messaging application or to another contact's dialog. Such rules may be embedded in an application or in the MFGUI, for example.

According to one aspect, a plurality of MFGUIs are provided, which resemble multiple layers. Each MFGUI has properties of an operating system shell, and therefore has low level access, for example to hardware resources, without necessarily being processed by another shell. While such schemas are common in virtual machine environments, the MFGUIs can also interact with each other and the basic shell for the system (if it exists). Thus, each MFGUI acts as a portal for a user to isolate and provide different interface configurations for potentially different aspects of the system, while also allowing interaction and maintenance of consistency. For example, a user may have multiple projects, or different task types (number crunching, chat, correspondence) each having a different status and configuration, and each potentially using different instances of a single application open. However, a single speech interface system may be provided to control the various aspects, and tunnels may be provided to permit coordinated communication between applications or processes associated with different MFGUIs, and perhaps between the various MFGUIs and their respective processes and applications.

In a speech enabled system, audio input is directed to a speech recognizer to determine whether contextually applicable commands are present and depending on the context, if in a dictation mode, what words are spoken, and typically commands, once determined, are not treated as textual representations of the spoken command, but rather are presented to applications available to receive such commands through an application programming interface (API). In such an environment, traditionally only a single application (or the operating system) will be notified of a command match by the speech recognition engine which distinguishes commands and data. If two separate applications contend for control, inconsistencies may result, and the speech recognition engine resolves such ambiguity by preferring commands over data and also by deciding which application should be notified of the match. For example, commands are generally processed statistically to map the input to a response, and if the mapping is ambiguous, the speech engine provides its own dialog with the user for disambiguation. Each application has its own set of commands, and may use similar spoken representations for different results, or even have the same spoken representation. Therefore, traditional systems must have some hierarchy and central control.

According to the present invention, there may be advantage to providing a textual representation of recognized commands, for example for use by applications other than the target of the command, and to provide a unified data stream for a second or alternate level of analysis. Further, this permits an alternate system or additional to the speech recognition engine help disambiguate or ensure completeness of commands.

7.2 MFGUI Facets

The use of a single window display with a plurality of facets divided into a plurality of distinct viewing areas called "Facets" enables users to view multiple applications at one time .time. The active facets of the MFGUI are "tiled" subwindows and are all maintained within the confines of that MFGUI window. Even when additional applications are activated subsequently, the configuration and number of the facets in the MFGUI may change, but no additional high-level windows ever appear. Moreover, once an application is activated, it remains active until closed, even when subsequent applications are activated and take their place in the MFGUI. However, as with all GUI environments where more than one application may be running, even when all facets of the MFGUI are occupied by an active application, only one facet can receive the input focus at one time, and that is the facet that contains the CCA.

Each facet of the display area has an independent application taking its input therefrom and routing its outputs thereto, and applications and their child windows move in and out of the facets to accommodate other applications. Applications that move out of MFGUI can close, or can remain active in the background waiting until they are called upon to return to the display. All activated applications can run simultaneously to provide the appearance of multitasking, and applications can be used in any sequence in order to execute commands, and an application can be used without the need for the application to appear in the MFGUI.

Although it is understood that any number of facets and configurations can be utilized, it is preferred to use a maximum of three or four facets at a time. The human brain can handle three or four facets at a time without taxing the users. The exception to this may be sub-processes of an application wherein the sub-processes are all related to the current task. For example, an instant messaging program where the user may be interacting with numerous contacts or have numerous conversations going on at a single time. An excessive number of facets creates cluttered view, and will eventually result in too many small facets where it becomes difficult to keep track of the information displayed in each application. Likewise, the prior art methods are difficult for users to deal with because parent/child windows appear one on top of another, creating an obscured, cluttered look to the screens. In the present invention, each display area corresponds to one of the active facets, which are all part of a single high-level window.

However, in alternate embodiments the number of facets and the shape, size and placement of facets can be fixed at a different value or variable according to the design of the system, preferences of the user and the number of active applications. When variable facets are utilized, as other applications are activated, each facet can also reshape (or morph) itself to bring a new application into one of the viewing areas. In the preferred embodiment, as the System State and context of the user input changes from one application to another, the System manages applications within the MFGUI and its facets to accommodate what is needed to accomplish the task. In some embodiments, the facets in the MFGUI are dynamic and change in number, size and placement according to the needs of the applications in use.

In the preferred embodiment, the System does not load applications into the MFGUI, the System requests the operating system ("OS") to execute the applications, and for that the OS loads them in memory, and allocates to them some processing time. However, in alternate embodiments, the System could function as a speech enabled operating system and perform this function.

The facets within each MFGUI may each associated with a respective application, though an application may have more than one associated facet, and not each active application need be associated with a facet. Likewise, it is possible for an application to be associated with a facet in multiple MFGUIs. The facets may be manually defined in size, shape and arrangement, as well as layering, as appropriate. On the other hand, in many cases, it is useful to have the facets automatically arrayed within an MFGUI, in accordance with a set of rules or an algorithm. For example, a facet may have a size, shape or arrangement which is fixed, or responsive to an activity of the associated application, or information content of the facet. Likewise, facets may change in size, shape and or location depending on the number of applications being displayed, for example three facets being adjusted to accommodate an application in a fourth facet. Thus, one aspect of this embodiment provides that the size of a facet changes in response to the content being displayed, and this permits screen display optimization. The changes may be, for example, immediate or gradual (e.g., fluidic). In some cases, facets with low activity may be selectively hidden or closed to permit more space for active facets which display dynamically changing information to a user. In other instances, dynamic changes are not preferred, and rather consistency is important. For example, a parameter file may establish the number, size and location of respective facets in an MFGUI, which is then fixed in accordance with this file. Likewise, the application association of the facets may also be fixed.

8 BRIEF DESCRIPTION OF THE FIGURES

8.1 Overview of the Figures

The FIGS. shown here are not meant to be limiting, but rather, in designing the system, different components can be combined with each other or modified in order to achieve desired design and functionality for the System. The steps shown in the various FIGS. can be used in different combinations to create other alternate embodiments.

9 DESCRIPTION OF THE FIGURES

9.1 Detail Description of the Figures

Figure 1:
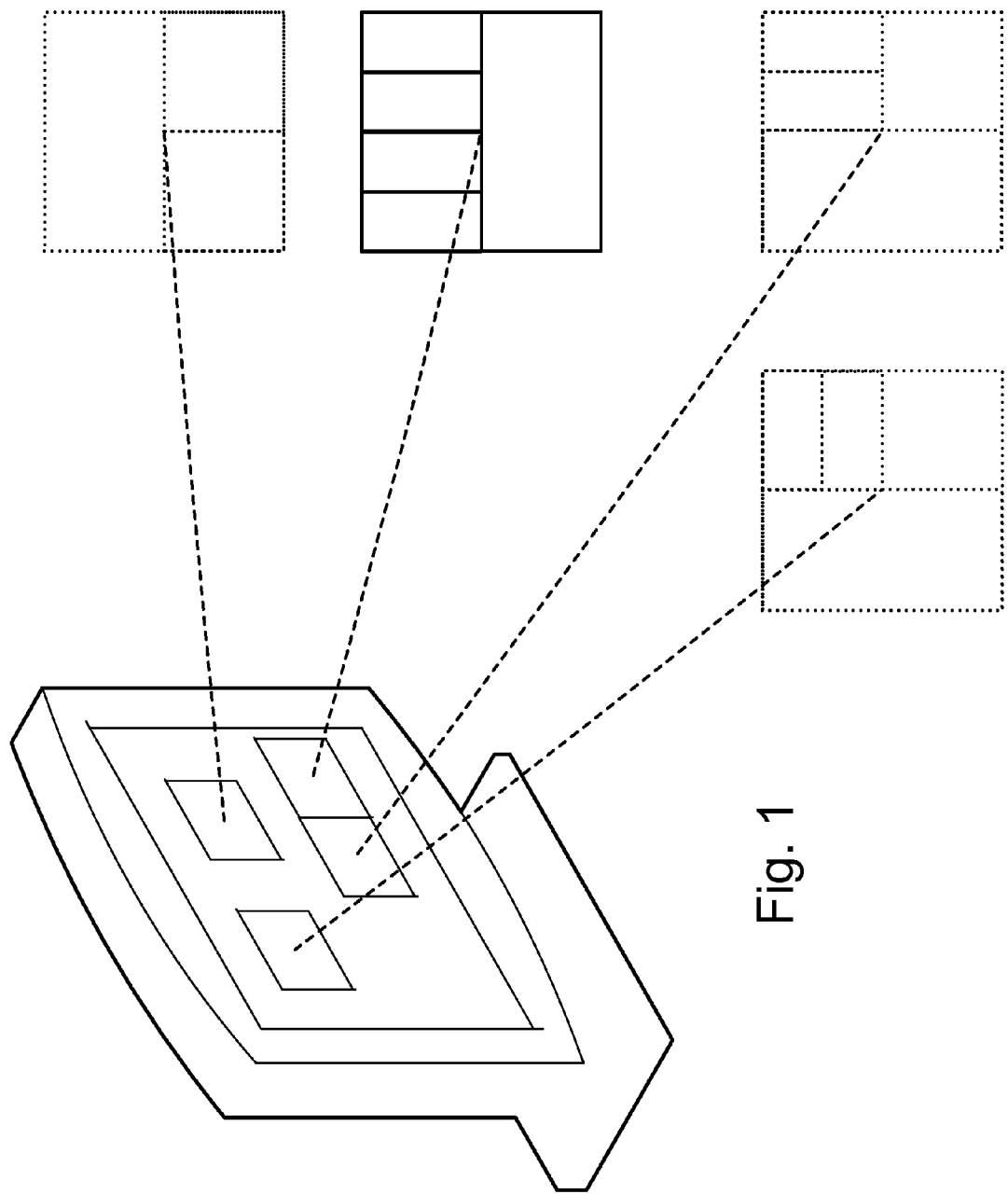
FIG. 1 shows a multiple shell MFGUI with four shells, each shell displaying various possibilities for configurations of facets within each shell.
Figure 2:
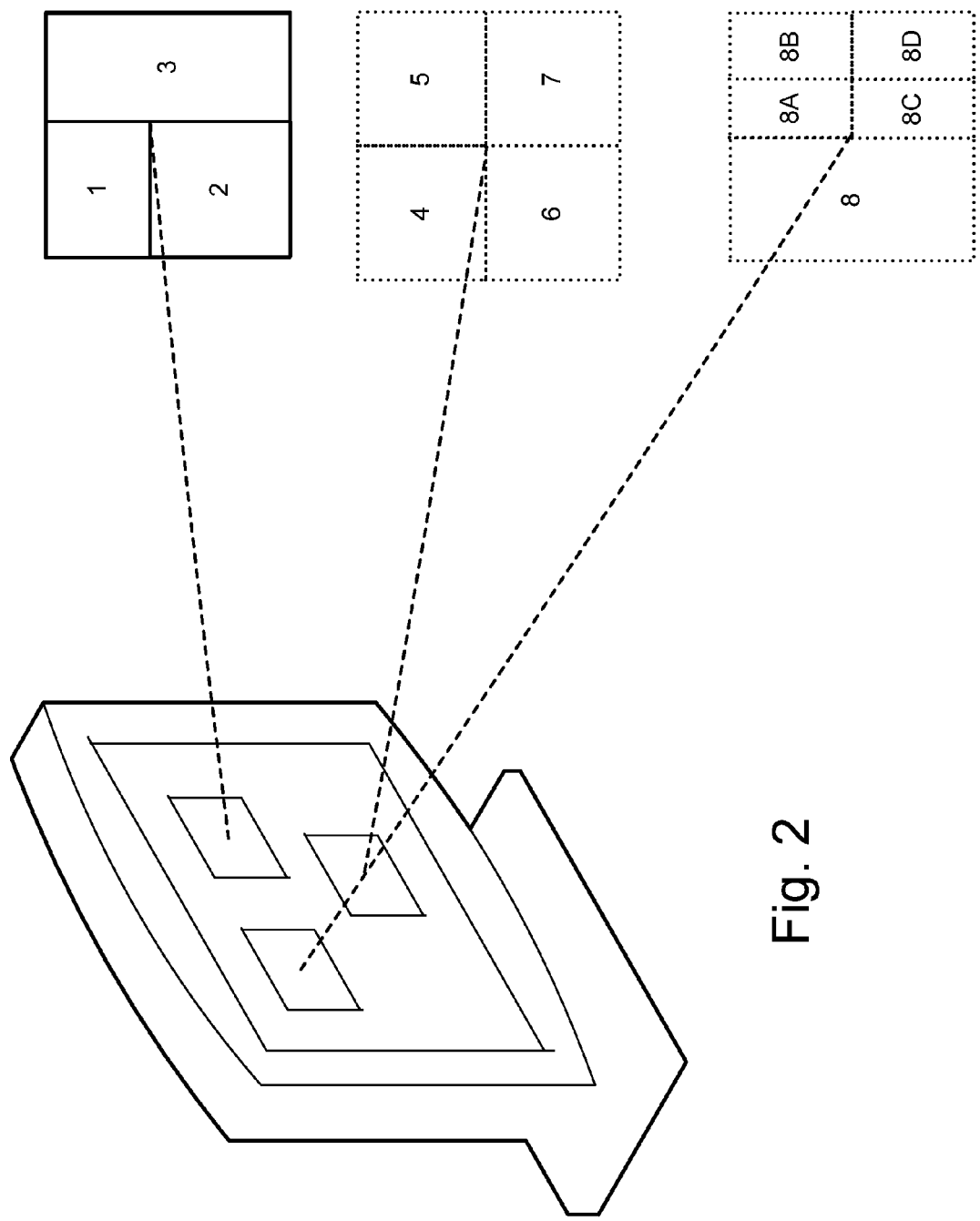
FIG. 2 shows a multiple shell MFGUI wherein applications and processes are organized in different shells according to user input.

FIG. 1 shows a multiple shell MFGUI with four shells displaying various possibilities for configurations of facets within each shell. The second shell from the top is the one currently being displayed and the application in the facet in the upper left corner has focus. Applications and processes are associated with various facets within various shells, and can be organized randomly, by group based on user input or by the system based on the source of the input or the type of application or process. Although four shells are shown in this figure, any number of shells can be used by the system. Likewise, facet configurations are not limited to the ones shown, and each shell can adapt the configuration of facets to accommodate more or less applications or processes based on user input FIG. 2 shows a multiple shell MFGUI wherein applications and processes are organized in different shells according to user input or the type of application or process. For example, a user may choose to organize calendar, contact and email related applications in one shell (applications 1, 2 and 3 for example), word processing documents in another shell (applications 4, 5, 6 and 7) and an instant messaging application and its sub-processes in another (8 being the instant messaging application and 8*a*, 8*b*, 8*c* and 8*d* being the contact or conversation dialogs). Although in the preferred embodiment, the grouping of applications and processes (or sub-processes) is done by the user, in an alternate embodiment this could be done by the system based on the type of application/process. Alternatively, the user could choose whether to do this or let the system do it. In FIG. 2, the top shell is the one currently being displayed and the application in facet 3 has focus.

Figure 3:
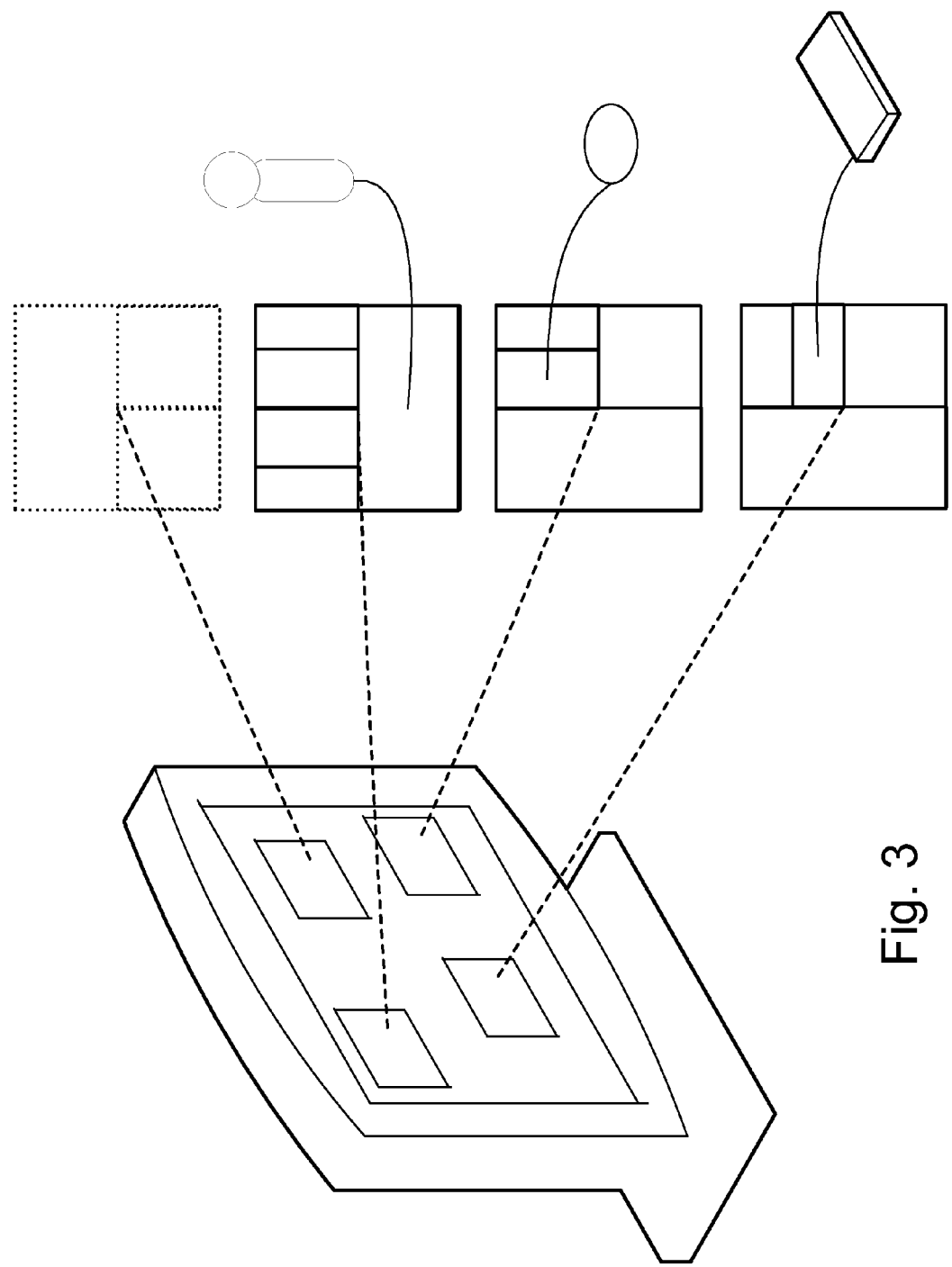
FIG. 3 shows a multiple shell MFGUI wherein input is directed to a shell in dependence upon the source.

FIG. 3 shows a multiple shell MFGUI wherein input is directed to a shell in dependence upon the source. Input from speech, the keyboard and mouse are each directed to at least one application or process in at least one facet within their respective shells. This grouping of input by shell can be done automatically or as determined by the user. If desired, one or more shells can contain and display a composite of applications and processes from the other shells. For example, the shell on the left displays a facet from each of the other shells in a single view (although more or less than three facets could be displayed)

10 CLOSING

Examples of alternate embodiments and variations thereof are not intended to be limiting, but to demonstrate the flexibility in which the System of the present invention can be structured and designed to function in order to perform its objectives, as they may vary according to system design or implementation. Having described the preferred and some alternate embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What I claim is:

1. A computing system, comprising:
   a processor;
   a memory configured to store instructions for controlling the processor;
   a user interface device configured to receive natural language speech input;
   a graphic user interface comprising an array of facets arranged in a tiled configuration, at least one of the facets being associated with at least one application; and
   a natural language speech parser configured to parse the received natural language speech input according to instruction grammars to determine instructions and respective parameters of the determined instructions,
   wherein, upon receipt of natural language speech input comprising a first instruction and a first parameter of the first instruction, the processor is configured to cause a focus to shift to a facet associated with a first application associated with the respective first parameter of the first instruction and to vary the first facet from a first size to a second size, the second size occupying substantially an entire viewable portion of the graphic user interface, and pass the first instruction and respective first parameter for processing by the first application associated with the facet, and upon subsequent receipt of natural language speech input comprising a second instruction, the processor is configured to cause the focus to shift away from the facet associated with the first application associated with the first parameter and return the first facet to the first size, and
   wherein, upon receipt of natural language speech input comprising the first instruction and a second parameter, the processor is configured to cause the focus to shift to a second facet associated with a second application associated with the second parameter of the first instruction, to vary the second facet from a third size to the second size, and upon subsequent receipt of natural language speech input comprising the second instruction, to cause the focus to shift away from the second facet associated with the second parameter and to return the second facet to the third size.

2. The system of claim 1, wherein the first instruction comprises an instruction adapted to open at least one of the first application and the second application.

3. The system of claim 1, wherein the second instruction comprises an instruction adapted to close at least one of the first application and the second application.

4. The system of claim 1, further comprising a video camera system configured to determine a respective facet at which a human user is pointing.

5. A method for controlling a human computer interface, comprising:
provide a user interface device for receiving natural language speech input;
generating a graphic user interface comprising an array of facets arranged in a tiled configuration, at least one of the facets being associated with at least one application; and
implementing a natural language speech parser configured to parse received natural language speech input according to instruction grammars to determine instructions and respective parameters of the determined instructions,
wherein, upon receipt of natural language speech input comprising a first instruction and a first parameter of the first instruction, shifting a focus to a facet associated with a first application associated with the respective first parameter of the first instruction and to vary the first facet from a first size to a second size, the second size occupying substantially an entire viewable portion of the graphic user interface, and passing the first instruction and respective first parameter to the first application associated with the facet for processing, and upon subsequent receipt of natural language speech input comprising a second instruction, shifting a focus away from the facet associated with the first application associated with the first parameter and return the first facet to the first size, and
wherein, upon receipt of natural language speech input comprising the first instruction and a second parameter, shifting the focus to a second facet associated with a second application associated with the second parameter of the first instruction, varying the second facet from a third size to the second size, and upon receipt of natural language speech input comprising the second instruction, shifting the focus from the second facet associated with the second parameter and returning the second facet to the third size.

6. The method of claim 5, wherein the first instruction comprises an instruction adapted to open at least one of the first application and the second application.

7. The method of claim 5, wherein the array of facets represents multiple concurrently executing applications, further comprising causing the facets associated with respective applications to automatically move in and out of a display area of the graphic user interface in accordance with an activity of the respective application.

8. The method of claim 5, wherein the array of facets represents multiple concurrently executing applications, further comprising causing cause the facets associated with respective applications automatically change shape in accordance with an activity of the respective application.

9. The method of claim 5, wherein the focus for natural language speech input is different from a focus for a pointing device input.

10. The method of claim 5, further comprising acquiring a video image to determine a respective facet at which a human user is looking.

11. The method of claim 5, further comprising storing state information of the graphic user interface before shifting a focus to the first application.

12. The method of claim 5, wherein the graphic user interface displays a prompt representing a plurality of possible commands corresponding to the natural language speech input.

13. The method of claim 12, wherein the prompt is context sensitive.

14. The method of claim 5, wherein the at least one application has an associated priority, further comprising processing the natural language speech input in order of application priority.

15. The method of claim 5, further comprising concurrently parsing the natural language speech input according to a set of available grammars representing respectively different commands, and assessing a completeness of the natural language speech input with respect to the set of available grammars.

16. A non-transitory computer readable medium containing instructions for controlling an automated processor to perform the steps, comprising:
generating a graphic user interface comprising an array of facets arranged in a tiled configuration, at least one of the facets being associated with at least one application; and
implementing a natural language speech parser configured to parse received natural language speech input according to instruction grammars to determine instructions and respective parameters of the determined instructions,
wherein, upon receipt of natural language speech input comprising a first instruction and a first parameter of the first instruction, the processor causes a focus to shift to a facet associated with a first application associated with the respective first parameter of the first instruction and to vary the first facet from a first size to a second size, the second size occupying substantially an entire viewable portion of the graphic user interface, and to pass the first instruction and respective first parameter for processing by the first application associated with the facet, and upon subsequent receipt of natural language speech input comprising a second instruction, the processor causes the focus to shift away from the facet associated with the first application associated with the first parameter and return the first facet to the first size, and
wherein, upon receipt of natural language speech input comprising the first instruction and a second parameter, the processor causes the focus to shift to a second facet associated with a second application associated with the second parameter of the first instruction, to vary the second facet from a third size to the second size, and upon receipt of natural language speech input comprising the second instruction, the processor causes the focus to shift from the second facet associated with the second parameter and to return the second facet to the third size.

17. The non-transitory computer readable medium of claim 16, wherein the first instruction comprises an instruction adapted to open at least one of the first application and the second application.

18. The non-transitory computer readable medium of claim 16, wherein the array of facets represents multiple concurrently executing applications, further comprising causing the facets associated with respective applications to automatically move in and out of a display area of the graphic user interface in accordance with an activity of the respective application.

19. The non-transitory computer readable medium of claim 16, wherein the array of facets represents multiple concurrently executing applications, further comprising causing cause the facets associated with respective applications automatically change shape in accordance with an activity of the respective application.

20. The non-transitory computer readable medium of claim 16, further comprising acquiring a video image to determine a respective facet at which a human user is looking.

\* \* \* \* \*